Oct. 5, 1926.
C. N. WUNNENBERG
REFRIGERATING SYSTEM OR APPARATUS
Filed Nov. 1, 1923
1,601,935
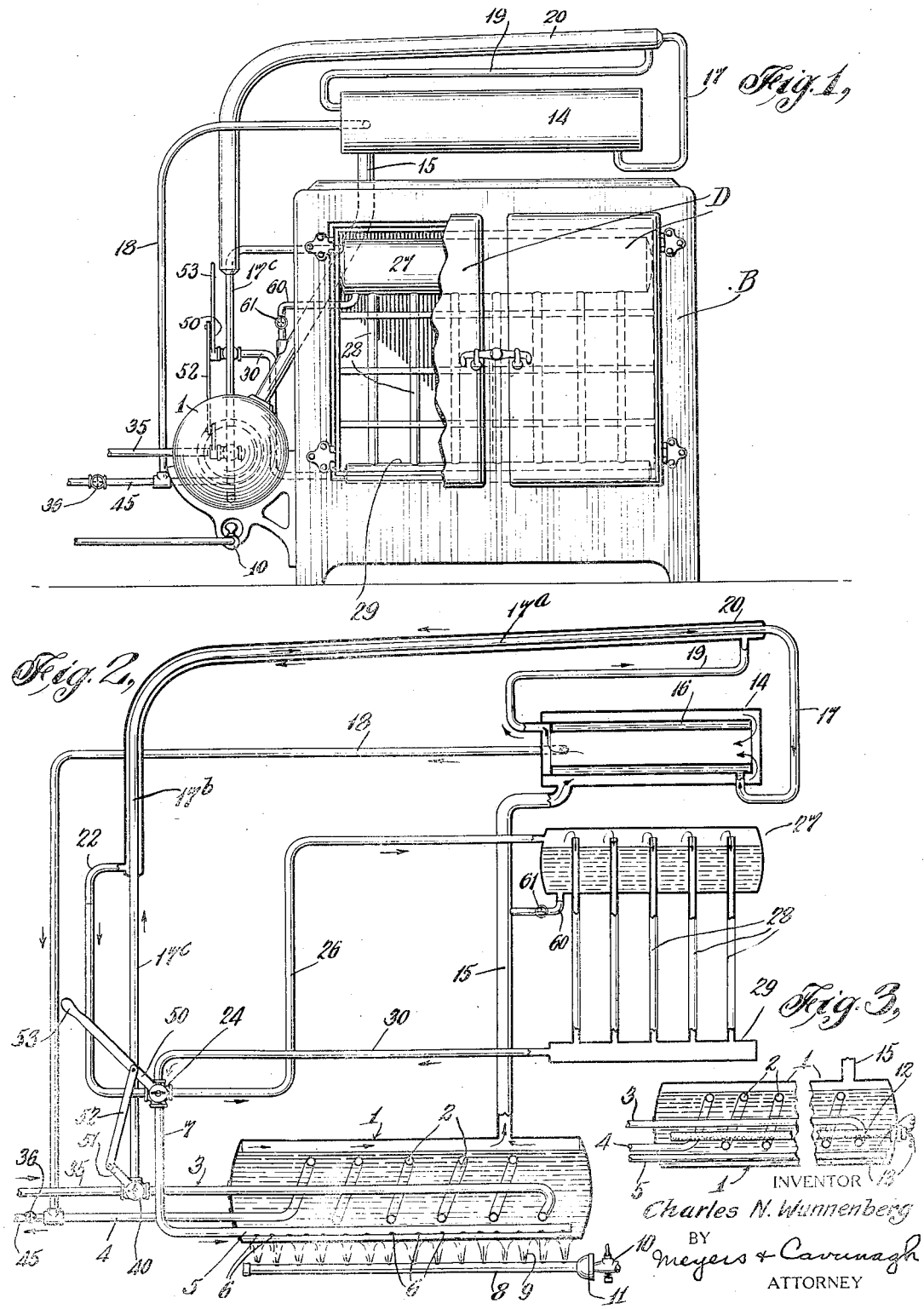
INVENTOR
Charles N. Wunnenberg
BY
Meyers & Cavanagh
ATTORNEY Patented Oct. 5, 1926.

1,601,935

UNITED STATES PATENT OFFICE.

CHARLES N. WUNNENBERG, OF NEW YORK, N. Y., ASSIGNOR OF ONE-HALF TO PHILIPP WIRTH, OF NEW YORK, N. Y.

REFRIGERATING SYSTEM OR APPARATUS.

Application filed November 1, 1923. Serial No. 672,108.

My invention relates to improved refrigerating apparatus of the absorption type.

The general object of the invention is to provide an apparatus of this type which is simple, compact, and inexpensive, and is therefore adaptable for domestic use.

A further important object is to dispense with any pump or motor drive and thus avoid complications and annoyances incident to motor driven apparatus, especially in domestic installations, and to further enable the apparatus to be used in any place where a convenient source of heat, such as gas or electricity, is available.

The characteristics and advantages of the invention are sufficiently further explained in connection with the following detail description of the accompanying drawing, which shows an exemplifying embodiment of the invention. After considering this, persons skilled in the art will understand that many variations may be made within the principles of the invention, and I contemplate the employment of any structures which are properly within the scope of the appended claim.

Fig. 1 is a front elevation of an apparatus embodying the invention in one form as applied to a domestic refrigerator.

Fig. 2 is a sectional diagram of the apparatus.

Fig. 3 is a sectional detail of a modified heating arrangement.

Referring first to the diagram, Fig. 2, a main or solution tank 1, which may otherwise be identified as a heating tank, is filled with a solution of ammonia in water, of suitable strength, say approximately 45%, up to about the indicated level, leaving usually a moderate space at the top of the tank above the solution level. Within the tank, below the solution level, is a cooling coil 2 to which water is supplied through a pipe 3 and discharged through a pipe 4. Near the bottom of the tank is a return pipe 5 having small apertures or jets 6 arranged to discharge ammonia gas downward toward the tank bottom. This return pipe has an external portion 7. The tank is supplied with any suitable heating means such as a gas burner pipe 8 having jets or nozzles 9 with a suitable valve 10 and air mixer 11 to supply combustible air and gas mixture to the jets. Otherwise any other known or suitable heating arrangement may be provided, such as an electric resistance heating element enclosed in a tube or casing 12 (Fig. 3) this casing being located within the tank and submerged in the body of solution therein. Conductors 13 are indicated for connecting the electric heating element to any suitable or convenient power line, and any suitable regulating means such as a switch may be provided, these details forming no part of the present invention.

Preferably located substantially above tank 1 is a moisture separator 14, consisting of an outer jacket or casing to which ammonia gas is conveyed from the upper part of tank 1 through a pipe 15. Within the separator 14 is a tubular water jacket 16 supplied with water through a pipe 17 and discharging water through a pipe 18. The ammonia gas is taken from separator 14 through a pipe 19 to a condensing jacket 20 surrounding a slightly inclined portion 17$^a$, of a pipe 17, this portion being of substantial length and preferably connecting with a substantially vertical portion 17$^b$, the condensing jacket 20 conforming to the arrangement of the cooling pipe, and conducting ammonia gas and condensed ammonia in a counter-flow relation to the movement of cooling water in the pipe. From the lower end of the condensing jacket a pipe 22 conveys condensed ammonia to a four-way valve 24. A pipe 26, when the valve is set as shown in Fig. 2, conveys the liquefied ammonia to a receiving tank 27. Expansion or refrigerating pipes 28 communicate with the upper part of tank 27 above the normal maximum ammonia level therein. While the number and arrangement of these pipes may vary greatly, they usually have a substantially downward course and terminate in a header 29 from which a pipe 30 leads to four-way valve 24 in opposite relation to the point of connection of pipe 17 previously mentioned.

While the water supply arrangement may vary, conveniently, a substantial unitary cooling water system is provided, including a single supply pipe 35. This supply pipe leads to a three-way valve 40 in the same flow line as pipe 3 previously mentioned, and portion 17$^c$ of pipe 17 communicates with this three-way valve in the position clearly indicated. A single discharge pipe 45 is connected to pipes 4 and 18, and a controlling valve 36 is placed in pipe 45.

While the ammonia and water control valves 24 and 40 might in some cases be independently controlled, it is desirable to interconnect them so that they will be properly positioned in relation to each other at all times. For this purpose the stem of each valve is provided with a lever arm 50 and 51 respectively, and these arms are connected by a link 52. One of the levers such as 50 is extended to provide a convenient operating handle 53.

Desirably the receiving tank 27 is provided with a drain pipe 60 leading to the solution tank, conveniently by connection to pipe 15, and controlled by valve 61, to permit any water accumulating in the receiver to be drawn off at a suitable time and returned to the solution tank, for instance, after all ammonia has been removed from the receiver tank in the expansion part of the cycle. This water draining operation is only necessary at relatively infrequent intervals since water accumulates only slowly, if at all, in the receiving tank.

The operation is as follows:

At the end of the expansion cycle tank 1 is filled up to normal level with an aqueous solution of ammonia of proper strength, and receiver 27 is empty. The valves are then set in the position indicated in Fig. 2, shutting off cooling water from coil 2 and supplying cooling water to the system including pipe portions 17$^c$, 17$^b$, 17$^a$, 17, cooling jacket 16 in the separator, and return pipe 18 to water discharge pipe 45. Valve 24 is positioned to afford communication between pipes 22 and 26, and to close pipe 30 at the valve. Heat is now applied to tank 1, for instance, by the gas heater shown, sufficient to gradually drive off ammonia gas from solution without unduly heating or approaching the boiling point of the water. The heating process is continued until the desired part of ammonia content is driven off in the form of vapor through pipe 15 to separator casing 14, where the vapor comes into contact with cooling jacket 16, and any moisture in the ammonia gas is condensed and returns to tank 1 through pipe 15. The ammonia vapor continues through pipe 19 to condensing jacket 20. On its course through this jacket as indicated by the arrows, it is gradually chilled and condensed by the lowering of its temperature and pressure caused by the heating operation. The liquefied ammonia passes from pipe 26 to receiving tank 27 and at the end of the heating operation rises about to the level indicated, somewhat below the upper ends of expansion pipes 28. Heating of tank 1 is now discontinued and handle 53 is moved to place the valves in their other operative position. Communication between pipes 22 and 26 is thus cut off at valve 24 while the valve establishes communication between pipes 30 and 7; the water circulation is also changed so that water flows from the main supply pipe 35 to pipe 3 and so to and through the cooling coil in tank 1 and out again through pipe 4 to the main discharge pipe 45. The cooling of the water in tank 1 and vapor in the upper tank space and in pipe 15, and connected vapor passages, produces a reduction of pressure in tank 1 which, in turn, lowers the pressure on the liquid ammonia in receiving tank 27. Vaporization of this ammonia therefore begins, the vapor passing down through the expansion pipes and absorbing heat therefrom and from any surrounding materials or chamber to be refrigerated, the warmed vapor reaching header 29 and passing through pipes 30 and 7 to return pipe 5, and issuing from the small apertures or jets 6 into a large body of cool water which quickly absorbs the heated gas. This process continues until all, or substantially all the liquid ammonia in the receiver is expanded and re-absorbed into solution in tank 1, or in other words, until the solution is restored to its normal strength. The cycle may then be repeated. The expansion or refrigerating part of the cycle may be controlled as to duration or intensity by regulating the flow of cooling water in coil 2, that is, by manipulating valve 36 which controls the movement of cooling water. If the valve is closed partly or entirely the flow of cooling water is correspondingly reduced and the capacity of the water in tank 1 to re-absorb the warm ammonia gas is correspondingly reduced or, in other words, the pressure in receiving tank 27 is raised and evaporation of the liquid ammonia is correspondingly reduced. Conversely, if valve 36 is opened wide, a maximum cooling effect is produced and the liquid ammonia will expand at a maximum rate with the greatest cooling effect. With ordinary regulation of the apparatus where especially intense cooling is not desired, the expansion or refrigerating part of the cycle will occupy say about twenty-four hours and the heating part or time required to charge the receiver with liquid ammonia will require about one hour or even less.

Fig. 1 shows the apparatus applied to, or associated with, a domestic refrigerator as only one example of its practical adaptations. The receiver 27 and refrigerating pipes 28 are conveniently arranged within a refrigerator or ice box B having doors D as usual, tank 27 being located upwardly and at the rear of the refrigerator interior, and expansion pipes 28 and header 29 being also at the back of the box where they are out of the way and leave the greatest amount of room for articles to be refrigerated. Other parts of the apparatus are supported upon or at one side of the refrigerator, as sufficiently understood by comparison of reference numerals with diagrammatic Fig. 2.

By the described construction and arrangement of parts the control of circulation is obtained by the manipulation of a single element, namely, the handle 53, and control of the heat supply. The valves are thereby positioned so that no accident or faulty operation can be caused by improper positioning of the main valves of the apparatus. Aside from handle 53, the only controlling element is the water valve 36 which controls the amount of water supplied to coil 2 during the refrigerating part of the cycle. This very simple control dispenses with any expansion valve adjacent to the receiver or the expansion pipes 28 and obviates any danger of leakage or any difficulties of operation in the hands of inexperienced users such as are frequently incident to the use of expansion valves. Pumps or power devices of any sort are also dispensed with and the apparatus is therefore not only simple and economical in the first instance, but is easily kept in condition without any expense for repairs such as are necessary in connection with motors and pumps employed in other systems.

What I claim is:

A refrigerating system of the class described, comprising a solution tank, means for supplying heat to it, a separator located at a substantial elevation above the solution tank, a condensing passage having a main portion located above the separator and sloping downward, a receiver located at a level intermediate the solution tank and the separator, a vapor passage extending approximately vertically from the solution tank to the separator, a passage from the separator to the initial end of the condensing passage, a controllable connection from the discharge end of the condensing passage to the receiver, expansion pipes proceeding from the receiver, a controllable return connection from the expansion pipes to the solution tank, cooling means for the solution tank, cooling jackets for the separator and condensing passage, and a valve drain connection from the receiver to the vertical passage connecting the solution tank and the separator.

Signed at New York in the county of New York and State of New York this 31st day of October A. D. 1923.

CHARLES N. WUNNENBERG.